Figure 25:
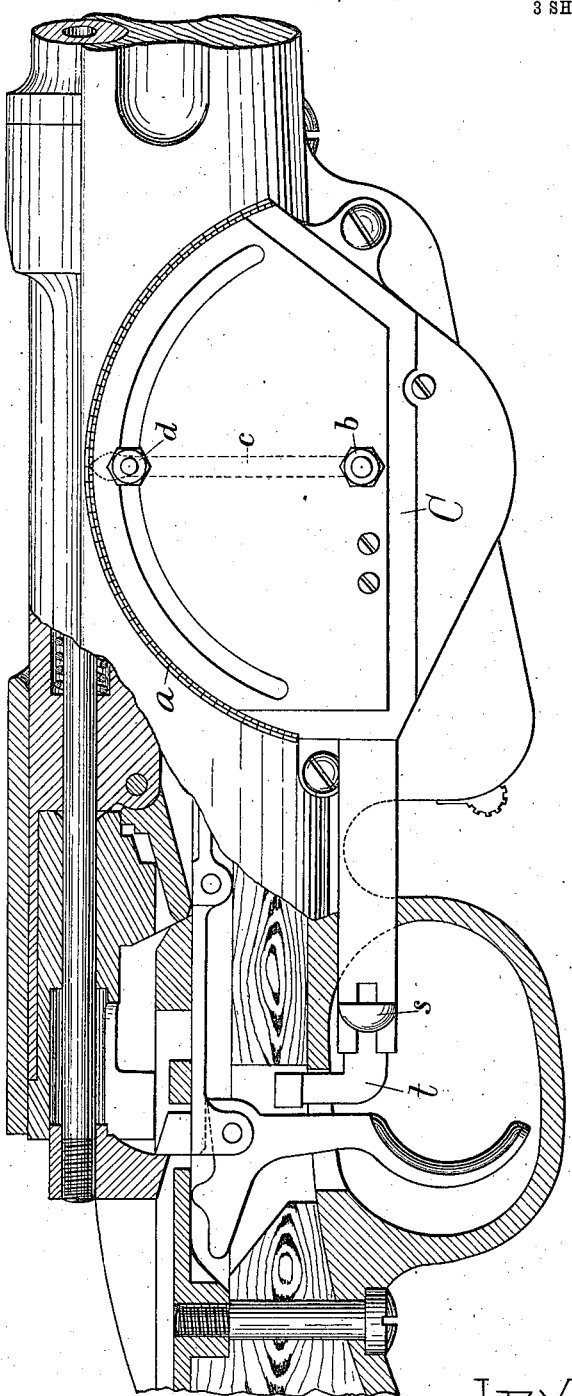

No. 877,850. PATENTED JAN. 28, 1908.
T. MANCIU.
APPARATUS FOR THE AUTOMATIC DISCHARGE OF FIREARMS ON ATTAINING A PREDETERMINED ELEVATION.
APPLICATION FILED JAN. 4, 1906.
3 SHEETS—SHEET 1.
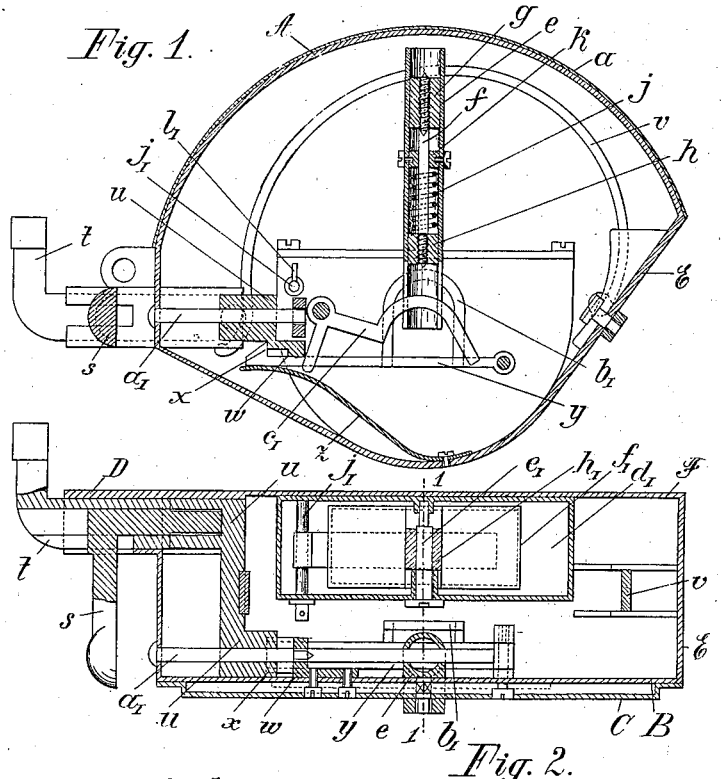
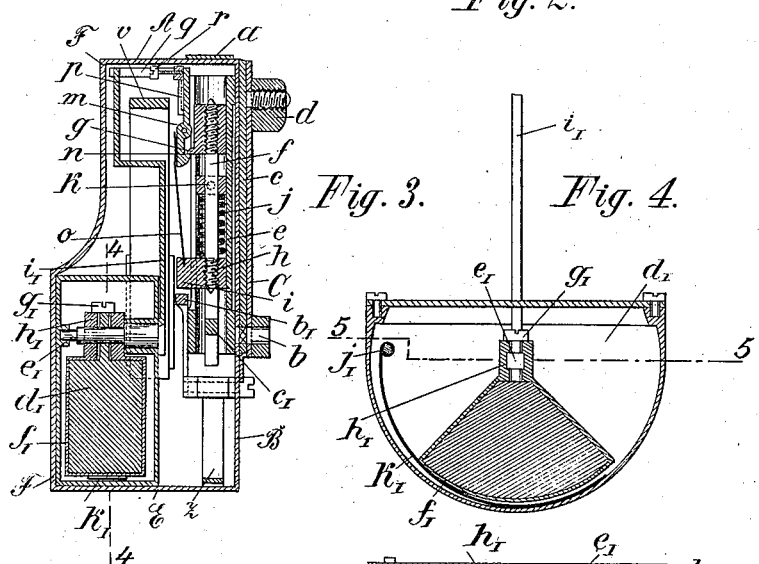
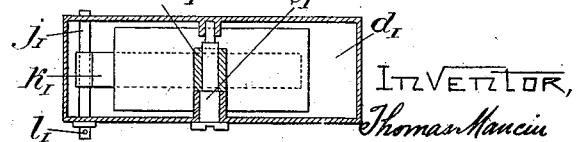
WITNESSES.
INVENTOR,
Thomas Manciu No. 877,850. PATENTED JAN. 28, 1908.
T. MANCIU.
APPARATUS FOR THE AUTOMATIC DISCHARGE OF FIREARMS ON ATTAINING A PREDETERMINED ELEVATION.
APPLICATION FILED JAN. 4, 1906.
3 SHEETS—SHEET 2.
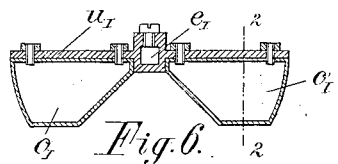
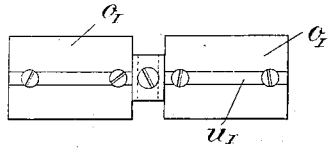
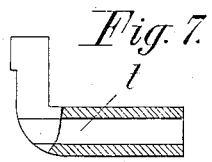
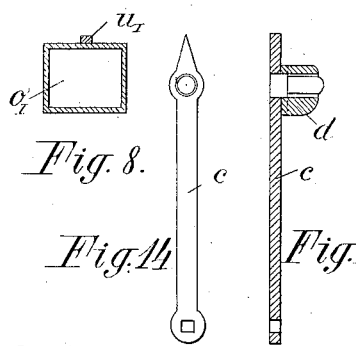
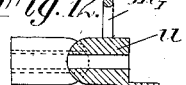
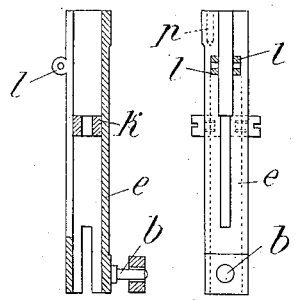
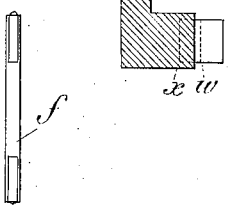
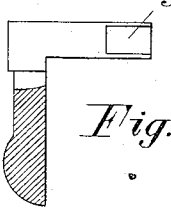

No. 877,850. PATENTED JAN. 28, 1908.
T. MANCIU.
APPARATUS FOR THE AUTOMATIC DISCHARGE OF FIREARMS ON ATTAINING A PREDETERMINED ELEVATION.
APPLICATION FILED JAN. 4, 1906.

3 SHEETS—SHEET 3.

Witnesses.
Wm. O. Bell.
A. Glatt.

Inventor,
Thomas Manciu,
by Gartner & Seward,
Attorneys.

UNITED STATES PATENT OFFICE.

THOMAS MANCIU, OF IGLAU, AUSTRIA-HUNGARY.

APPARATUS FOR THE AUTOMATIC DISCHARGE OF FIREARMS ON ATTAINING A PREDETERMINED ELEVATION.

No. 877,850.   Specification of Letters Patent.   Patented Jan. 28, 1908.

Application filed January 4, 1906. Serial No. 294,568.

*To all whom it may concern:*

Be it known that THOMAS MANCIU, premier lieutenant in the I. R. Austro-Hungarian army, a subject of the Emperor of Austria-Hungary, stationed at Iglau, Moravia, Austria-Hungary, has invented certain new and useful Improvements in Apparatus for the Automatic Discharge of Firearms on Attaining a Predetermined Elevation, of which the following is a specification.

The object of the present invention is to provide a device for hand fire arms which discharges the shot automatically at the moment at which the fire arm has reached the position corresponding to the elevation and aiming angle for the target. For this purpose a compressed spring acts upon the trigger and ignition mechanism, the release of which is effected by means of a pendulum dipping into a liquid, or by means of a counterbalanced float which is arranged to be placed horizontally upon a liquid surface. The device can be easily attached to any weapon, and in the following constructional example is described as attached to the Austrian army rifle and as secured upon the handle alongside the magazine with the prolonged box body and holding screw.

In the accompanying drawing Figure 1 illustrates a longitudinal section Fig. 2 a transverse section and Fig. 3 a section on the line 1—1 of Fig. 2. Figs. 4 and 5 are sectional views on the lines 4—4 and 5—5 of Figs. 3 and 4, respectively. Figs. 6 and 7 show respectively a longitudinal section and a plan, and Fig. 8 a section on the line 2—2 of Fig. 6 of a second constructional form of the pendulum. Figs. 9 to 24 illustrate the most important parts of the device separately. Fig. 25 illustrates the mechanism attached to a gun.

Upon the cover A of the casing of the device there is provided a graduation $a$ obtained experimentally, by aid of which the lever $c$ fixed upon an axle $b$ can be adjusted corresponding to the angle of elevation increased by the angle of position and which can be held fast by means of a nut $d$ (Figs. 3, 14 and 15). With the lever $c$ there moves to the same angle a tube $e$ to the under projection whereof the lever $c$ is fastened between the casing wall B and the protecting wall C. In an interior collar $k$ of the tube $e$ (Figs. 3 and 10) there is arranged the bolt $f$ provided with a threading at each end; the upper end of this bolt bears a head piece provided with a nose $g$ (Fig. 19) while upon the lower end there is screwed a guiding piece $h$ with which there is connected a striker $i$ projecting through a slot of the tube $e$. Around the bolt $f$ is coiled a spiral spring $j$, which supports itself on the one hand against the interior collar $k$ fastened by means of screws in the tube $e$, and on the other hand supports itself against the guide piece $h$. At the upper part of the tube $e$ there are arranged two lugs $l$ (Fig. 16) on each side of the slot, in which the pivot of a lever $m$ is supported, which lever terminates in a hook $n$ (Fig. 3).

The striking piece $i$ of the guide piece $h$ bears a spring $o$ which presses the hook $n$ constantly against the slot of the tube $e$. At the upper end of the tube $e$ there is provided a rib $p$ in the bore of which the pivot of an angle lever $q$ (Figs. 3 and 24) is revolubly supported. The turning of this angle lever is limited by a wedge piece, which holds the lever in its position. In the short arm of the angle lever there is provided a set screw $r$ by means of which the length of the engagement between the hook $n$ of the lever $m$ and the projection $g$ of the head piece can be regulated.

After the position angle has been estimated or determined by means of a measuring device attached to the apparatus, the pointer of the lever $c$ is adjusted with regard to the elevation to the corresponding point of the graduation $a$, and with the raised or lowered mouthpiece of the fire arm and without applying this to the shoulder the setting-piece $s$ (Fig. 2) is pressed forwards. Thereby the setting-piece $s$ is moved in the perforated and slotted striking piece $t$ (Figs. 2 and 9). The striking piece is placed in a tubular-shaped projection D of the casing and bears a quadrangular head which passes through the casing of the apparatus, lies in front of the trigger and releases this latter when the striking piece is pushed back. Upon the piece $s$ is attached an elbow piece $u$ (Figs. 2 and 13) which during the forward motion compresses the spring $v$ which is attached on the casing of the apparatus to the wall E (Fig. 1). The forward motion of the elbow piece $u$ follows until its head slides with its part W and on continued motion with the other part $x$ over the hook of a one-armed lever $y$, which lever is constantly held in connection with the catches of the elbow piece by means of a spring $z$, and prevents its sliding back along a guide bolt $a^1$. The one-armed lever $y$ bears sidewise a loop $b_1$ (Figs. 1, 2 and 3) which loop presses against the striking piece $i$. During the second half of the motion of the elbow piece over the part $x$, the front surface of the piece $u$ presses against the short arm of the angle lever $c_1$, (Fig. 1) whereby the curved arm of the angle lever raises the guide piece $h$ until the hook of the lever $m$ engages under the projection $g$ of the head piece (Fig. 3) and the spring $j$ is compressed. The engagement of the lever $m$ under the projection $g$ of the head piece follows on the passing over of the part $x$ to a certain amount so that the then free part $s$ slips back to this extent in the part $x$, the angle lever $c_1$ sinks again and a space between the guide piece $h$ and the curved arm of the lever $c_1$ occurs. The motion of the curved arm of the angle lever $c_1$, takes place in a short lower slot of the casing $e$.

Within the casing F of the device there is fixed a vessel $d_1$ filled with a liquid such as glycerin, which is closed by means of a ground in plate. In this vessel there is a pendulum fastened upon an axle $e_1$ by means of the screw $g_1$, which pendulum is composed of a shield $f_1$ and a rectangular head $h_1$ through which the axle $e_1$ passes. The axle projects at one end through the side wall of the vessel $d_1$ and is provided outside with a crank piece $i_1$ (Fig. 3). Upon a second shaft $j_1$ supported in the walls of the vessel $d_1$ is fixed a spring $k_1$ (Fig. 4), which spring presses against the pendulum and holds it fast. The shaft $j_1$ projects likewise through one side wall of the vessel $d_1$ and bears outside the arm $l_1$. On the commencement of the motion of the elbow piece $u$ from the point $w$ to the point $x$ a projection $m_1$ (Fig. 12) of the elbow piece $u$ presses against the arm $l_1$ and presses the spring $k_1$ against the lower casing wall, whereby the pendulum is released.

The pendulum is so constructed that it possesses on the one hand a short period of oscillation, and on the other hand the moving power thereof is approximately equal to the resistance of the fluid mass, in the present case to the resistance of glycerin so that after oscillation it rapidly regains its position of rest. If the setting piece $s$ be left free and the fire arm aimed at the target, then the crank piece $i_1$ strikes against the long arm of the angle lever $q$ (Fig. 3). This latter presses with its short arm against the long arm of the lever $m$ whereupon the hook $n$ retreats from the projection $g$ of the head piece and releases this latter. The striker $i$ now presses, in consequence of the action of the spiral spring, against the loop $b_1$ of the one-armed lever $y$ and disengages its hook from the part $x$ of the elbow piece $u$. The piece $u$ is thrust back together with the setting piece $s$ by the action of the spring $v$, and carries the striker $t$ with it, which striker hits against the trigger of the weapon by means of its quadrangular head and thus discharges the shot.

In Figs. 6, 7 and 8 a second constructional form of the pendulum is illustrated. This consists of a rod $u_1$ fixed upon the shaft $e_1$ in the middle, which shaft bears at both ends two counter-balanced light hollow bodies $o_1$. The casing $d_1$ is only partly filled with a specifically heavy liquid, such, for instance, as glycerin, in which the hollow bodies $o_1$ float. The liquid surface which constantly adjusts itself horizontally, holds the hollow bodies, and consequently also the rod $u_1$ fixed on the axle $e_1$ in the horizontal position; consequently the crank piece $i_1$ correspondingly secured to the end of the axle will be always in the perpendicular position.

Having now particularly described and ascertained the nature of my said invention and in what manner the same is to be performed, I declare that what I claim is:—

1. In a gun, the combination, with the trigger, of a trigger-operating mechanism, and means, comprising a pendulum and a liquid containing receptacle inclosing the pendulum for setting said trigger-operating mechanism in operation, substantially as described.

2. In a gun, the combination, with the trigger, of a spring-actuated trigger-operating mechanism normally held retracted, and means, comprising a pendulum and a liquid containing receptacle inclosing the pendulum, for setting said trigger-operating mechanism in operation, substantially as described.

3. In a gun, the combination, with the trigger, of a spring-actuated trigger-operating mechanism, means for normally retaining said mechanism retracted against the tension of its spring, and means, comprising a pendulum and a liquid containing receptacle inclosing the pendulum, for causing said first named means to release the trigger-operating mechanism, substantially as described.

4. In a gun, the combination, with the trigger, of a trigger-operating mechanism, and means, comprising a pendulum and a liquid containing receptacle inclosing the pendulum, for setting said trigger-operating mechanism in operation, a part of said mechanism and said means being adjustable the one with reference to the other whereby to make said means actuate said mechanism at a predetermined elevation of the gun, substantially as described.

5. In a gun, the combination with the trigger, of a spring-actuated trigger-operating device, means for holding said device normally retracted, a mechanism for actuating said means whereby to cause it to release said device, and means, comprising a pendulum and a liquid containing receptacle inclosing the pendulum, for setting said mechanism in operation, said mechanism being adjustable with reference to said last-named means whereby to make the same actuate said mechanism at a predetermined elevation of the gun, substantially as described.

6. In a gun, the combination, with the trigger, of a trigger-operating mechanism, a liquid-containing receptacle, a swinging device controlled by the liquid in said receptacle, and means for transmitting motion from said device to the trigger-operating mechanism whereby to actuate the latter, substantially as described.

In testimony whereof he has hereunto set his hand in presence of two subscribing witnesses.

THOMAS MANCIU.

Witnesses:
HARRY BELMONT,
ALVESTO S. HOGUE.